United States Patent [19]

Swarztrauber

[11] Patent Number: 5,689,722
[45] Date of Patent: Nov. 18, 1997

US005689722A

[54] MULTIPIPELINE MULTIPROCESSOR SYSTEM

[75] Inventor: Paul Noble Swarztrauber, Boulder, Colo.

[73] Assignee: University Corporation for Atmospheric Research, Boulder, Colo.

[21] Appl. No.: 639,315

[22] Filed: Apr. 24, 1996

Related U.S. Application Data

[63] Continuation of Ser. No. 7,766, Jan. 22, 1993, abandoned.
[51] Int. Cl.$^6$ .............................. G06F 15/80; G06F 15/16
[52] U.S. Cl. .................. 395/800; 395/200.1; 395/200.03
[58] Field of Search .............................. 395/800, 200.03, 395/200.01, 200.1; 382/49; 364/DIG. 1, DIG. 2; 371/43

[56] References Cited

U.S. PATENT DOCUMENTS

| | | | |
|---|---|---|---|
| 4,621,339 | 11/1986 | Wagner et al. | 364/900 |
| 4,730,322 | 3/1988 | Pollara-Bozzola | 371/43 |
| 4,811,214 | 3/1989 | Nosenchuck et al. | 364/200 |
| 4,855,903 | 8/1989 | Carleton et al. | 364/200 |
| 4,868,830 | 9/1989 | Pollara-Bozzola | 391/43 |
| 5,038,386 | 8/1991 | Li | 382/49 |
| 5,301,104 | 4/1994 | Yalamanchili | 395/800 |

FOREIGN PATENT DOCUMENTS

| | | |
|---|---|---|
| 0 257 581 A2 | 2/1988 | European Pat. Off. . |
| WO 88/04077 | 2/1988 | WIPO . |

OTHER PUBLICATIONS

"Computer Architecture and Parallel Processing", Hwang et al. 1984, pp. 755–787, Eddy Machine (pp. 760–761).

Lee, M., et al., Network Facility for a Reconfigurable Computer Architecture, 1985, University of Texas at Austin (pp. 264–271).

*Primary Examiner*—Larry D. Donaghue
*Attorney, Agent, or Firm*—Duft, Graziano & Forest, P.C.

[57] ABSTRACT

The multipipeline multiprocessor includes communication hardware and parallel communication algorithms that are free of contention but also optimal in the sense that communication time is minimized for any vector computation task. This apparatus makes use of a hypercube processor interconnection network that has the capability to transmit on all wires simultaneously. A set of optimal routing algorithms for any of a plurality of communication tasks are either computed or stored in a memory to direct the interprocessor communication. Each computation task is defined as a plurality of sub-tasks, each sub-task defining a particular hypercube interconnection of the processors. The execution of the plurality of sub-tasks on the hypercube interconnection network implements the computation task. Selecting the plurality of sub-tasks in a manner that interconnects the processors in a non-blocking manner also reduces the communication time, since the activation of the hypercube interconnections are expeditiously accomplished, since no crosspoint switch settings must be computed.

30 Claims, 8 Drawing Sheets

| p | 1 | 2 | 3 | 4 | 5 | 6 | 6a |
|---|---|---|---|---|---|---|---|
| 0 | $x_0$ | $x_0$ | $x_0$ | $x_0$ | $x_0$ | $x_0$ | $x_0$ |
| 0 | $x_1$ | $x_1$ | $x_{17}$ | $x_{25}$ | $x_{29}$ | $x_{29}$ | $x_{31}$ |
| 0 | $x_2$ | $x_2$ | $x_2$ | $x_{18}$ | $x_{26}$ | $x_{30}$ | $x_{30}$ |
| 0 | $x_3$ | $x_3$ | $x_3$ | $x_3$ | $x_{19}$ | $x_{27}$ | $x_{31}$ | $x_{29}$ |
| 1 | $x_4$ | $x_{20}$ | $x_{28}$ | $x_{28}$ | $x_{28}$ | $x_{28}$ | $x_{28}$ | $x_{28}$ |
| 1 | $x_5$ | $x_5$ | $x_{21}$ | $x_{29}$ | $x_{25}$ | $x_{25}$ | $x_{25}$ | $x_{27}$ |
| 1 | $x_6$ | $x_6$ | $x_6$ | $x_{22}$ | $x_{30}$ | $x_{26}$ | $x_{26}$ | $x_{26}$ |
| 1 | $x_7$ | $x_7$ | $x_7$ | $x_7$ | $x_{23}$ | $x_{31}$ | $x_{27}$ | $x_{25}$ |
| 2 | $x_8$ | $x_{24}$ | $x_{24}$ | $x_{24}$ | $x_{24}$ | $x_{24}$ | $x_{24}$ | $x_{24}$ |
| 2 | $x_9$ | $x_9$ | $x_{25}$ | $x_{17}$ | $x_{21}$ | $x_{21}$ | $x_{21}$ | $x_{23}$ |
| 2 | $x_{10}$ | $x_{10}$ | $x_{10}$ | $x_{26}$ | $x_{18}$ | $x_{22}$ | $x_{22}$ | $x_{22}$ |
| 2 | $x_{11}$ | $x_{11}$ | $x_{11}$ | $x_{11}$ | $x_{27}$ | $x_{19}$ | $x_{23}$ | $x_{21}$ |
| 3 | $x_{12}$ | $x_{28}$ | $x_{20}$ | $x_{20}$ | $x_{20}$ | $x_{20}$ | $x_{20}$ | $x_{20}$ |
| 3 | $x_{13}$ | $x_{13}$ | $x_{29}$ | $x_{21}$ | $x_{17}$ | $x_{17}$ | $x_{17}$ | $x_{19}$ |
| 3 | $x_{14}$ | $x_{14}$ | $x_{14}$ | $x_{30}$ | $x_{22}$ | $x_{18}$ | $x_{18}$ | $x_{18}$ |
| 3 | $x_{15}$ | $x_{15}$ | $x_{15}$ | $x_{15}$ | $x_{31}$ | $x_{23}$ | $x_{19}$ | $x_{17}$ |
| 4 | $x_{16}$ | $x_{16}$ | $x_{16}$ | $x_{16}$ | $x_{16}$ | $x_{16}$ | $x_{16}$ | $x_{16}$ |
| 4 | $x_{17}$ | $x_{17}$ | $x_1$ | $x_9$ | $x_{13}$ | $x_{13}$ | $x_{13}$ | $x_{15}$ |
| 4 | $x_{18}$ | $x_{18}$ | $x_{18}$ | $x_2$ | $x_{10}$ | $x_{14}$ | $x_{14}$ | $x_{14}$ |
| 4 | $x_{19}$ | $x_{19}$ | $x_{19}$ | $x_{19}$ | $x_3$ | $x_{11}$ | $x_{15}$ | $x_{13}$ |
| 5 | $x_{20}$ | $x_4$ | $x_{12}$ | $x_{12}$ | $x_{12}$ | $x_{12}$ | $x_{12}$ | $x_{12}$ |
| 5 | $x_{21}$ | $x_{21}$ | $x_5$ | $x_{13}$ | $x_9$ | $x_9$ | $x_9$ | $x_{11}$ |
| 5 | $x_{22}$ | $x_{22}$ | $x_{22}$ | $x_6$ | $x_{14}$ | $x_{10}$ | $x_{10}$ | $x_{10}$ |
| 5 | $x_{23}$ | $x_{23}$ | $x_{23}$ | $x_{23}$ | $x_7$ | $x_{15}$ | $x_{11}$ | $x_9$ |
| 6 | $x_{24}$ | $x_8$ | $x_8$ | $x_8$ | $x_8$ | $x_8$ | $x_8$ | $x_8$ |
| 6 | $x_{25}$ | $x_{25}$ | $x_9$ | $x_1$ | $x_5$ | $x_5$ | $x_5$ | $x_7$ |
| 6 | $x_{26}$ | $x_{26}$ | $x_{26}$ | $x_{10}$ | $x_2$ | $x_6$ | $x_6$ | $x_6$ |
| 6 | $x_{27}$ | $x_{27}$ | $x_{27}$ | $x_{27}$ | $x_{11}$ | $x_3$ | $x_7$ | $x_5$ |
| 7 | $x_{28}$ | $x_{12}$ | $x_4$ | $x_4$ | $x_4$ | $x_4$ | $x_4$ | $x_4$ |
| 7 | $x_{29}$ | $x_{29}$ | $x_{13}$ | $x_5$ | $x_1$ | $x_1$ | $x_1$ | $x_3$ |
| 7 | $x_{30}$ | $x_{30}$ | $x_{30}$ | $x_{14}$ | $x_6$ | $x_2$ | $x_2$ | $x_2$ |
| 7 | $x_{31}$ | $x_{31}$ | $x_{31}$ | $x_{31}$ | $x_{15}$ | $x_7$ | $x_3$ | $x_1$ |

FIG 5

| p | 1 | 2 | 3 | 4 | 4a |
|---|---|---|---|---|---|
| 0 | $x_0$ | $x_0$ | $x_0$ | $x_0$ | $x_0$ | $x_0$ |
| 0 | $x_1$ | $x_5$ | $x_{13}$ | $x_{29}$ | $x_{29}$ | $x_{31}$ |
| 0 | $x_2$ | $x_{10}$ | $x_{26}$ | $x_{30}$ | $x_{30}$ | $x_{30}$ |
| 0 | $x_3$ | $x_{19}$ | $x_{23}$ | $x_{31}$ | $x_{31}$ | $x_{29}$ |
| 1 | $x_4$ | $x_4$ | $x_4$ | $x_{20}$ | $x_{28}$ | $x_{28}$ |
| 1 | $x_5$ | $x_1$ | $x_9$ | $x_9$ | $x_{25}$ | $x_{27}$ |
| 1 | $x_6$ | $x_{14}$ | $x_{30}$ | $x_{26}$ | $x_{26}$ | $x_{26}$ |
| 1 | $x_7$ | $x_{23}$ | $x_{19}$ | $x_{27}$ | $x_{27}$ | $x_{25}$ |
| 2 | $x_8$ | $x_8$ | $x_8$ | $x_8$ | $x_{24}$ | $x_{24}$ |
| 2 | $x_9$ | $x_{13}$ | $x_5$ | $x_{21}$ | $x_{21}$ | $x_{23}$ |
| 2 | $x_{10}$ | $x_2$ | $x_{18}$ | $x_{22}$ | $x_{22}$ | $x_{22}$ |
| 2 | $x_{11}$ | $x_{27}$ | $x_{31}$ | $x_{23}$ | $x_{23}$ | $x_{21}$ |
| 3 | $x_{12}$ | $x_{12}$ | $x_{12}$ | $x_{28}$ | $x_{20}$ | $x_{20}$ |
| 3 | $x_{13}$ | $x_9$ | $x_1$ | $x_1$ | $x_{17}$ | $x_{19}$ |
| 3 | $x_{14}$ | $x_6$ | $x_{22}$ | $x_{18}$ | $x_{18}$ | $x_{18}$ |
| 3 | $x_{15}$ | $x_{31}$ | $x_{27}$ | $x_{19}$ | $x_{19}$ | $x_{17}$ |
| 4 | $x_{16}$ | $x_{16}$ | $x_{16}$ | $x_{16}$ | $x_{16}$ | $x_{16}$ |
| 4 | $x_{17}$ | $x_{21}$ | $x_{29}$ | $x_{13}$ | $x_{13}$ | $x_{15}$ |
| 4 | $x_{18}$ | $x_{26}$ | $x_{10}$ | $x_{14}$ | $x_{14}$ | $x_{14}$ |
| 4 | $x_{19}$ | $x_3$ | $x_7$ | $x_{15}$ | $x_{15}$ | $x_{13}$ |
| 5 | $x_{20}$ | $x_{20}$ | $x_{20}$ | $x_4$ | $x_{12}$ | $x_{12}$ |
| 5 | $x_{21}$ | $x_{17}$ | $x_{25}$ | $x_{25}$ | $x_9$ | $x_{11}$ |
| 5 | $x_{22}$ | $x_{30}$ | $x_{14}$ | $x_{10}$ | $x_{10}$ | $x_{10}$ |
| 5 | $x_{23}$ | $x_7$ | $x_3$ | $x_{11}$ | $x_{11}$ | $x_9$ |
| 6 | $x_{24}$ | $x_{24}$ | $x_{24}$ | $x_{24}$ | $x_8$ | $x_8$ |
| 6 | $x_{25}$ | $x_{29}$ | $x_{21}$ | $x_5$ | $x_5$ | $x_7$ |
| 6 | $x_{26}$ | $x_{18}$ | $x_2$ | $x_6$ | $x_6$ | $x_6$ |
| 6 | $x_{27}$ | $x_{11}$ | $x_{15}$ | $x_7$ | $x_7$ | $x_5$ |
| 7 | $x_{28}$ | $x_{28}$ | $x_{28}$ | $x_{12}$ | $x_4$ | $x_4$ |
| 7 | $x_{29}$ | $x_{25}$ | $x_{17}$ | $x_{17}$ | $x_1$ | $x_3$ |
| 7 | $x_{30}$ | $x_{22}$ | $x_6$ | $x_2$ | $x_2$ | $x_2$ |
| 7 | $x_{31}$ | $x_{15}$ | $x_{11}$ | $x_3$ | $x_3$ | $x_1$ |

FIG 6

| p | 1 | 2 | 3 | 4 | 4a |
|---|---|---|---|---|---|
| 0 | $x_0$ | $x_0$ | $x_0$ | $x_0$ | $x_0$ | $x_0$ |
| 0 | $x_1$ | $x_8$ | $x_8$ | $x_8$ | $x_8$ | $x_4$ |
| 0 | $x_2$ | $x_2$ | $x_{16}$ | $x_4$ | $x_4$ | $x_8$ |
| 0 | $x_3$ | $x_{17}$ | $x_{24}$ | $x_{24}$ | $x_{12}$ | $x_{12}$ |
| 1 | $x_4$ | $x_4$ | $x_4$ | $x_{16}$ | $x_{16}$ | $x_{16}$ |
| 1 | $x_5$ | $x_{12}$ | $x_{12}$ | $x_{12}$ | $x_{24}$ | $x_{20}$ |
| 1 | $x_6$ | $x_6$ | $x_{20}$ | $x_{20}$ | $x_{20}$ | $x_{24}$ |
| 1 | $x_7$ | $x_{21}$ | $x_{28}$ | $x_{28}$ | $x_{28}$ | $x_{28}$ |
| 2 | $x_8$ | $x_1$ | $x_1$ | $x_1$ | $x_1$ | $x_1$ |
| 2 | $x_9$ | $x_9$ | $x_9$ | $x_9$ | $x_9$ | $x_5$ |
| 2 | $x_{10}$ | $x_{24}$ | $x_{17}$ | $x_5$ | $x_5$ | $x_9$ |
| 2 | $x_{11}$ | $x_{11}$ | $x_{25}$ | $x_{25}$ | $x_{13}$ | $x_{13}$ |
| 3 | $x_{12}$ | $x_5$ | $x_5$ | $x_{17}$ | $x_{17}$ | $x_{17}$ |
| 3 | $x_{13}$ | $x_{13}$ | $x_{13}$ | $x_{13}$ | $x_{25}$ | $x_{21}$ |
| 3 | $x_{14}$ | $x_{28}$ | $x_{21}$ | $x_{21}$ | $x_{21}$ | $x_{25}$ |
| 3 | $x_{15}$ | $x_{15}$ | $x_{29}$ | $x_{29}$ | $x_{29}$ | $x_{29}$ |
| 4 | $x_{16}$ | $x_{16}$ | $x_2$ | $x_2$ | $x_2$ | $x_2$ |
| 4 | $x_{17}$ | $x_3$ | $x_{10}$ | $x_{10}$ | $x_{10}$ | $x_6$ |
| 4 | $x_{18}$ | $x_{18}$ | $x_{18}$ | $x_6$ | $x_6$ | $x_{10}$ |
| 4 | $x_{19}$ | $x_{26}$ | $x_{26}$ | $x_{26}$ | $x_{14}$ | $x_{14}$ |
| 5 | $x_{20}$ | $x_{20}$ | $x_6$ | $x_{18}$ | $x_{18}$ | $x_{18}$ |
| 5 | $x_{21}$ | $x_7$ | $x_{14}$ | $x_{14}$ | $x_{26}$ | $x_{22}$ |
| 5 | $x_{22}$ | $x_{22}$ | $x_{22}$ | $x_{22}$ | $x_{22}$ | $x_{26}$ |
| 5 | $x_{23}$ | $x_{30}$ | $x_{30}$ | $x_{30}$ | $x_{30}$ | $x_{30}$ |
| 6 | $x_{24}$ | $x_{10}$ | $x_3$ | $x_3$ | $x_3$ | $x_3$ |
| 6 | $x_{25}$ | $x_{25}$ | $x_{11}$ | $x_{11}$ | $x_{11}$ | $x_7$ |
| 6 | $x_{26}$ | $x_{19}$ | $x_{19}$ | $x_7$ | $x_7$ | $x_{11}$ |
| 6 | $x_{27}$ | $x_{27}$ | $x_{27}$ | $x_{27}$ | $x_{15}$ | $x_{15}$ |
| 7 | $x_{28}$ | $x_{14}$ | $x_7$ | $x_{19}$ | $x_{19}$ | $x_{19}$ |
| 7 | $x_{29}$ | $x_{29}$ | $x_{15}$ | $x_{15}$ | $x_{27}$ | $x_{23}$ |
| 7 | $x_{30}$ | $x_{23}$ | $x_{23}$ | $x_{23}$ | $x_{23}$ | $x_{27}$ |
| 7 | $x_{31}$ | $x_{31}$ | $x_{31}$ | $x_{31}$ | $x_{31}$ | $x_{31}$ |

FIG 7

| p | 1 | 2 | | 2a |
|---|---|---|---|---|
| 0 | $x_0$ | $x_0$ | $x_0$ | $x_0$ |
| 0 | $x_1$ | $x_9$ | $x_9$ | $x_3$ |
| 0 | $x_2$ | $x_{18}$ | $x_6$ | $x_6$ |
| 0 | $x_3$ | $x_3$ | $x_3$ | $x_9$ |
| 1 | $x_4$ | $x_{12}$ | $x_{12}$ | $x_{12}$ |
| 1 | $x_5$ | $x_{21}$ | $x_{21}$ | $x_{15}$ |
| 1 | $x_6$ | $x_6$ | $x_{18}$ | $x_{18}$ |
| 1 | $x_7$ | $x_7$ | $x_{15}$ | $x_{21}$ |
| 2 | $x_8$ | $x_{24}$ | $x_{24}$ | $x_{24}$ |
| 2 | $x_9$ | $x_1$ | $x_1$ | $x_{27}$ |
| 2 | $x_{10}$ | $x_{10}$ | $x_{30}$ | $x_{30}$ |
| 2 | $x_{11}$ | $x_{11}$ | $x_{27}$ | $x_1$ |
| 3 | $x_{12}$ | $x_4$ | $x_4$ | $x_4$ |
| 3 | $x_{13}$ | $x_{13}$ | $x_{13}$ | $x_7$ |
| 3 | $x_{14}$ | $x_{30}$ | $x_{10}$ | $x_{10}$ |
| 3 | $x_{15}$ | $x_{15}$ | $x_7$ | $x_{13}$ |
| 4 | $x_{16}$ | $x_{16}$ | $x_{16}$ | $x_{16}$ |
| 4 | $x_{17}$ | $x_{25}$ | $x_{25}$ | $x_{19}$ |
| 4 | $x_{18}$ | $x_2$ | $x_{22}$ | $x_{22}$ |
| 4 | $x_{19}$ | $x_{19}$ | $x_{19}$ | $x_{25}$ |
| 5 | $x_{20}$ | $x_{28}$ | $x_{28}$ | $x_{28}$ |
| 5 | $x_{21}$ | $x_5$ | $x_5$ | $x_{31}$ |
| 5 | $x_{22}$ | $x_{22}$ | $x_2$ | $x_2$ |
| 5 | $x_{23}$ | $x_{23}$ | $x_{31}$ | $x_5$ |
| 6 | $x_{24}$ | $x_8$ | $x_8$ | $x_8$ |
| 6 | $x_{25}$ | $x_{17}$ | $x_{17}$ | $x_{11}$ |
| 6 | $x_{26}$ | $x_{26}$ | $x_{14}$ | $x_{14}$ |
| 6 | $x_{27}$ | $x_{27}$ | $x_{11}$ | $x_{17}$ |
| 7 | $x_{28}$ | $x_{20}$ | $x_{20}$ | $x_{20}$ |
| 7 | $x_{29}$ | $x_{29}$ | $x_{29}$ | $x_{23}$ |
| 7 | $x_{30}$ | $x_{14}$ | $x_{26}$ | $x_{26}$ |
| 7 | $x_{31}$ | $x_{31}$ | $x_{23}$ | $x_{29}$ |

FIG 8

MULTIPIPELINE MULTIPROCESSOR SYSTEM

This application is a file wrapper continuation of application Ser. No. 08/007,766, filed Jan. 22, 1993, now abandoned.

This invention was made with Government support under Agreement No. ATM-8709659 awarded by the National Science Foundation. The Government has certain rights in this invention.

FIELD OF THE INVENTION

This invention relates to a computer system that consists of a plurality of parallel processors and, in particular, to a communication arrangement that provides contention free communication between the processors in a manner that minimizes the communication time for any vector computation task.

PROBLEM

It is a problem in the field of computers to improve the performance of computing systems. A substantial improvement in computer performance has been obtained by the use of pipelining or vectorization of a single processor. A further performance improvement in large scale mainframe computers has been obtained by the use of parallel processors. There are two fundamental and interrelated problems associated with parallel processing. First the plurality of processors must be interconnected in a way that the performance of the multiprocessor is as close as possible to the number of processors times the performance of a single processor. Second computations that were suitable for a single processor must be partitioned into a large number of computations that can be performed independently on distinct processors. The results from each processor must then be combined in some manner to provide the computations that would have been performed on the single processor. This sharing of computations requires a significant amount of communication between the processors. In practice, the time required for this interprocessor communication dominates the computational time and hence represents a significant impediment to improving the performance of parallel processors. Attempts to pipeline multiprocessors lead to the fundamental multiprocessor problem which is how to provide at least one useful word per computing cycle to every processor in the multiprocessor network.

For multiprocessor configurations that utilize relatively few processors, the most effective interprocessor communication is provided by the crossbar switch which provides a completely non-blocking network to interconnect inputs and outputs for all of the processors. Any one to one communication task can be implemented without blocking and with pipelining, so that one word can be provided to every processor on each communication cycle, using the crossbar switch. However, for a large number of processors, the crossbar switch becomes impractical because of the large number of wires and crosspoints that are required to implement this apparatus. An alternative network commonly used for interprocessor communication is the hypercube, which contains far fewer crosspoints than the crossbar switch. However, the computation of the crosspoint switch settings for both the crossbar switch and the hypercube network is very time consuming since there are many communication tasks and computational tasks that must be implemented. Extensive work has been done in the prior art to address the issues of blocking and contention in hypercube networks and the use of routers that are based solely on source and destination addresses are common. However, any network and routing procedure that permits blocking can not be optimal and significantly degrades the computing performance of the multiprocessor.

SOLUTION

The above described problems are solved and a technical advance achieved in the field by the multipipeline multiprocessor of the present invention. This system includes communication hardware and parallel communication algorithms that are free of contention but also optimal in the sense that communication time is minimized for any vector computation task. This apparatus makes use of a communication functional unit that interconnects each processor with a local memory. In addition, a hypercube-like processor interconnection network is provided which has the capability to transmit on all wires simultaneously. Finally, a set of optimal routing algorithms for any of a plurality of communication tasks are either computed or stored in memory to direct the interprocessor communication.

By predefining the communication tasks, it is possible to implement routings that provide substantially one useful word to every processor for each vector computation task on each communication cycle. Pipelining occurs in every processor and hence the computer is called the multipipeline multiprocessor. This system solves two major problems with multiprocessors: communication between processors is minimized and, programs that have been pipelined for a single processor can be ported in vector form, without modification, to the multipipeline multiprocessor. In practice, a set of predefined vector communication tasks are stored in a connection mapping memory. Each computation task is defined as a plurality of sub-tasks, each sub-task defining a particular communication sub-task. The execution of the plurality of communication sub-tasks on the hypercube interconnection network implements the computation task. Selecting the plurality of communication sub-tasks in a manner that interconnects the processors in a non-blocking manner reduces the communication time, since the activation of the hypercube interconnections are expeditiously accomplished. Furthermore, successive communication tasks can be interleaved when the sub-tasks of the previously executing communication task do not occupy all the interconnections of the hypercube network. Certain combinations of communication tasks permit the control apparatus of this invention to prestage a number of sub-tasks by concurrently activating them with the sub-tasks of the previously executing communication task. This multipipeline multiprocessor therefore solves the interprocessor communication problem that represents the significant impediment to improving the performance of parallel processors.

BRIEF DESCRIPTION OF THE DRAWING

FIG. 5 illustrates the communication cycles and exchanges for the implementation of syntax y(k)=x(32−k) with multiple pipelines on a hypercube with eight processors;

FIG. 6 illustrates the optimum communication cycles and exchanges for the implementation of the syntax y(k)=x(32-k);

FIG. 7 illustrates the optimum communication cycles and exchanges for the implementation of the syntax y(k)=x(4*k+1); and FIG. 8 illustrates the optimum communication cycles and exchanges for the implementation of the syntax y(k)=x(3*k+i).

DETAILED DESCRIPTION

The multipipeline multiprocessor includes communication hardware and parallel communication algorithms that are free of contention but also optimal in the sense that communication time is minimized for any vector computation task. This apparatus makes use of a hypercube-like processor interconnection network that has the capability to transmit on all wires simultaneously. A set of optimal routing algorithms, for any of a plurality of vector communications tasks, are computed or stored in memory in the form of connection maps to direct the interprocessor communication. Each computation task is defined as including a plurality of communication sub-tasks, each communication sub-task defining a particular optimal routing on the hypercube interconnection of the processors. The execution of the plurality of communication sub-tasks on the hypercube interconnection network implements the computation task. Selecting the plurality of communication sub-tasks in a manner that interconnects the processors in a non-blocking manner reduces the communication time by the expeditious activation of the hypercube interconnections.

System Architecture

Figure 1:
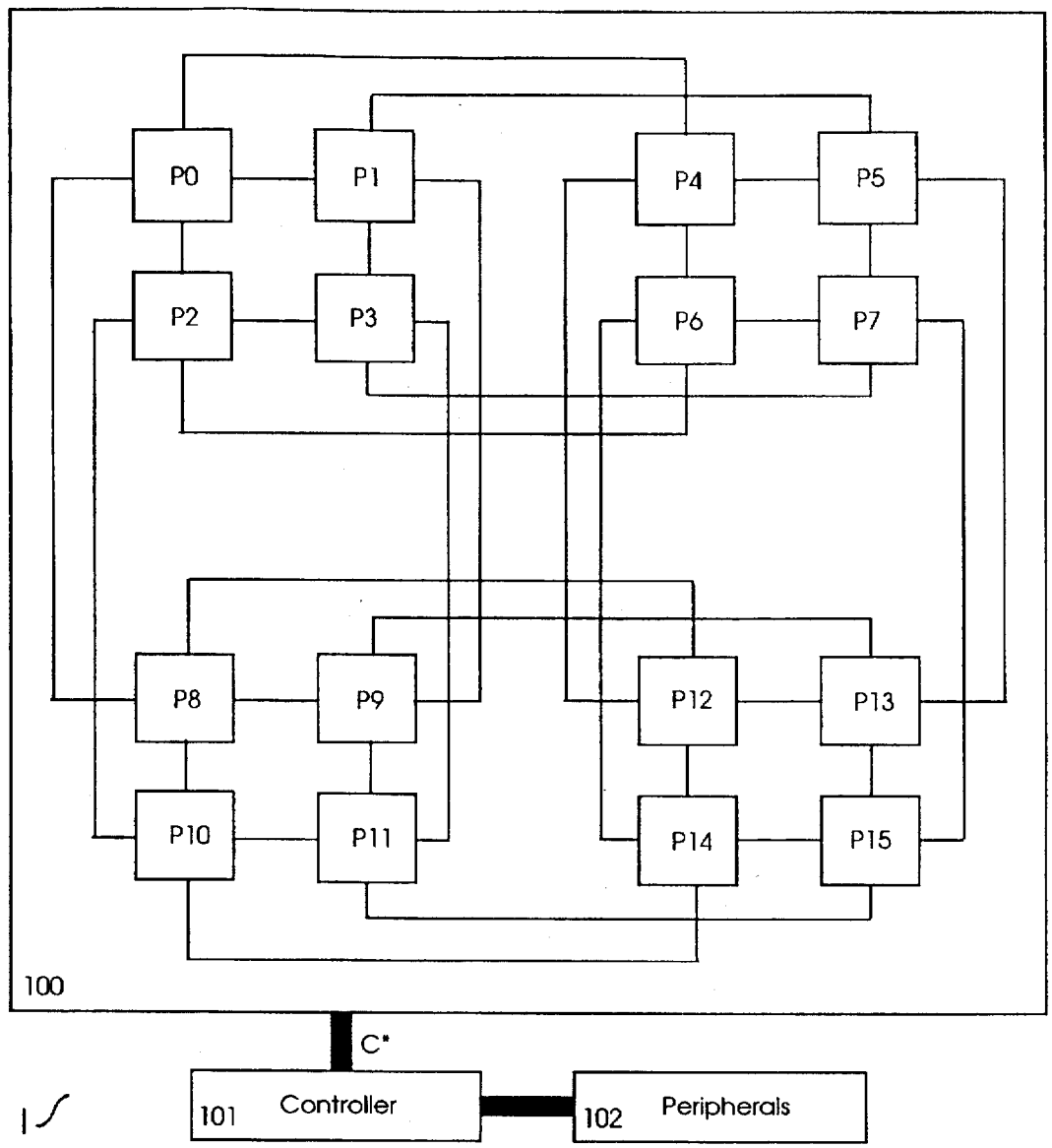
FIG. 1 illustrates the overall multipipeline multiprocessor with hypercube interconnections for the case with P=16 processors.

Although the function of the multipipeline multiprocessor depends primarily on parallel communication algorithms, it nevertheless requires certain hardware features that are collectively referred to as the "minimal architecture". FIG. 1 illustrates in block diagram form the overall architecture of the multipipeline multiprocessor 1 for the case of P=16 processors (P*). FIG. 1 depicts the processors P* with interconnections that are commonly referred to as the hypercube network 100. These connections are one of the features required by the "minimal architecture" for the multipipeline multiprocessor 1 of the present invention. This feature together with the other features required by the "minimal architecture" are:

a.) a hypercube-like interconnection network b.) bi-directional network communication c.) multi-wire network communication d.) collation of memory and network communications The Controller Each processor P0 through P15 in FIG. 1 is connected via bus C* to the controller 101 for the purpose of input or output (I/O) to or from the peripheral devices 102. The connections over bus C* are also used for the distribution of instructions to the processors P*. The controller 101 can function in a number of modes. The following three modes of control are well known techniques used in existing parallel processors.

A first parallel processor architecture is referred to as a single instruction multiple data (SIMD) computer. A single copy of the overall program resides on the controller 101 and identical instructions are broadcast to each processor P0–P15 and concurrently executed by each processor P0–P15. The processors P0–P15 operate synchronously in response to a time signal generated by a phase locked loop clock circuit (not shown). This approach is memory efficient since only one copy of the program exists.

A second parallel processor architecture is referred to as a multiple instruction multiple data (MIMD) computer. The controller 101 broadcasts the overall program to all processors P0–P15. Thereafter the processors P0–P15 operate asynchronously with operations initiated by the completion of previous operations or by the arrival or departure of data from the hypercube interconnection network 100. The most significant advantage of the MIMD computer is that different processors can execute a different instruction stream.

The third parallel processor architecture is referred to as a data parallel (DP) computer. The controller 101 broadcasts segments (perhaps large loops) of the overall program to an instruction cache that is located in each processor P0–P15. The operation is similar to MIMD but with a reduction in memory allocated to the program.

The Hypercube

The interconnections among processors P0–P15 illustrated in FIG. 1 define the traditional hypercube network 100. Although P=16 processors P, are shown, the hypercube network 100 can be extended in a straightforward manner to the case of $P=2^d$ processors P* for any integer d. For example, a hypercube with 32 processors can be constructed by first replicating FIG. 1 but with the processors P* renumbered from 16 to 31. Next, these processors P16–P31 are connected one to one with the original processors P0–P15 in FIG. 1. That is, processor P0 is connected to processor P16, processor P1 is connected to processor P17 and so forth. This construction can be extended to $P=2^d$ processors by again replicating the hypercube network 100 with 32 processors and so forth.

There are several alternative but equivalent definitions of the hypercube interconnect. Given an arbitrary collection of $P=2^d$ processors, the hypercube 100 interconnect can be defined by connecting any two processors P* whose binary representations differ in only one bit. For example, in FIG. 1, processor $P6=0110_b$ is connected to processors $P2=0010_b$, $P4=0100_b$, $P7=0111_b$ and $P14=1110_b$. This definition is used extensively in later sections to develop the parallel communication algorithms that are fundamental to the multipipeline multiprocessor 1.

Figure 2:
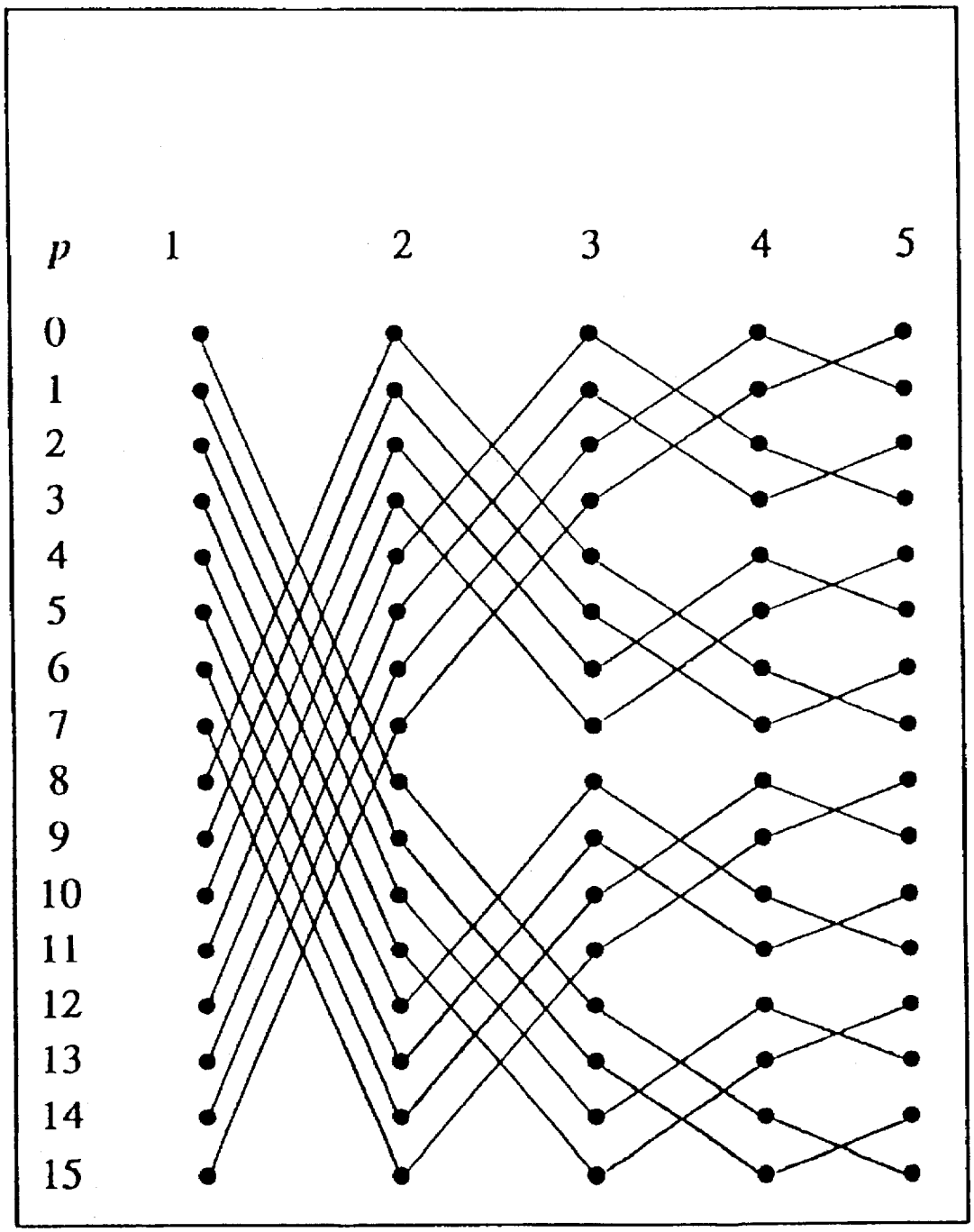
FIG. 2 provides an alternate graphic for the representation of the hypercube interconnections.

Since the interconnections in FIG. 1 are somewhat complex, an alternate graphic shown in FIG. 2 is commonly used to display the hypercube connections. Each processor P* is replicated $4=\log_2 P$ times corresponding to a row of black dots in FIG. 2. The dots in each row correspond to the same processor with number p given in the first column on the left. The interprocessor connections in FIG. 1 are then clearly evident in FIG. 2 as the lines that connect the dots. Note, however, that each interconnection in FIG. 1 is duplicated in FIG. 2 which permits bi-directional communication. Although bi-directional communication is not explicitly depicted in FIG. 1 it is nevertheless implicitly assumed since it is a necessary feature of the minimal architecture for the multipipeline multiprocessor 1. Therefore each connection in FIG. 1 represents a bi-directional channel through which data can be both sent and received at the same time. In addition to bi-directional hypercube interconnect 100, the minimal architecture of the multipipeline multiprocessor 1 must include the capability to transmit on all channels (wires) simultaneously. For example, the capability to transmit simultaneously on all of the connections shown in FIG. 2. Use of the term "wire" should not preclude the use of other channel technology such as optical channels.

The Processor

Figure 3:
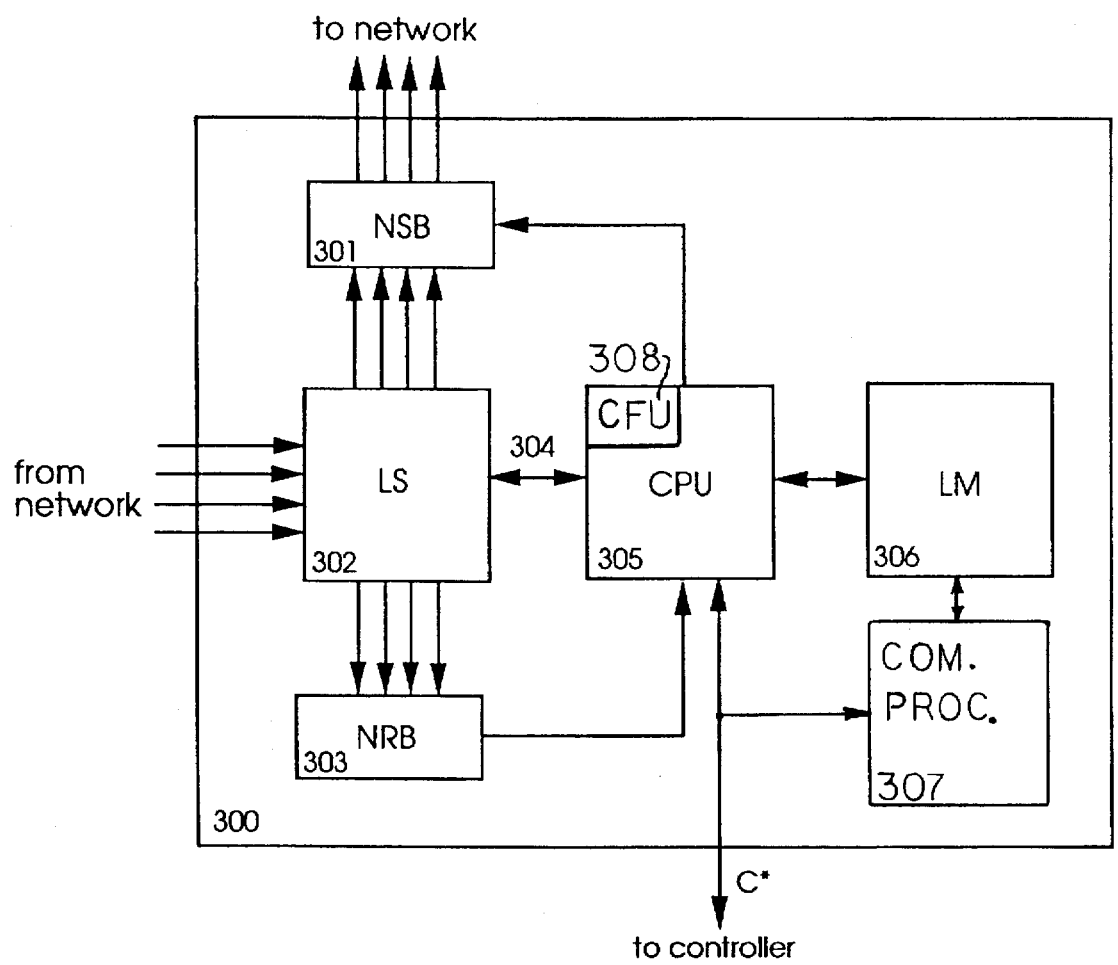
FIG. 3 illustrates the processor functional units which include a local switch (LS) 302, network receive buffer NRB 303, network send buffer (NSB) 301, central processing unit (CPU) 305, and local memory (LM) 306.

The details of each of processors P0–P15 in FIG. 1 are depicted as processor 300 in FIG. 3. For the case P=16, each processor is connected to $\log_2 P=4$ other processors in a manner defined by the hypercube interconnect network 100. Since each connection in FIG. 1 is assumed to be bi-directional, there are a total of eight channels to each processor corresponding to four channels from the network 100 and four channels to the network 100. These channels are depicted explicitly in both FIGS. 2 and 3. Each row of dots in FIG. 2 corresponds to a single processor like the one depicted in FIG. 3. Since the connections in FIG. 1 are assumed bi-directional, each connection in FIG. 1 corresponds to two connections in FIG. 3, namely a connection from the network 100 plus a connection to the network 100.

The last feature required for a minimal architecture is the capability to collate local memory 306 and network communications. To this end each processor 300 contains a communications unit with up to $\log_2 P$ inputs and $\log_2 P$ outputs. The functional units in each processor of the minimal architecture are given in FIG. 3. The local switch (LS) 302 can switch up to $p_1 \leq \log_2 P$ incoming transmissions directly to the network send buffer (NSB) 301 where data can be merged with data from the local memory (LM) 306 via the CPU 305. Incoming transmissions that are not switched to the network send buffer 301 are switched to the network receive buffer (NRB) 303 for subsequent storage in the local memory (LM) 306 via the CPU 305. There are $\log_2 P=4$ locations in both the network send buffer 301 and network receive buffer 303 that correspond to the $\log_2 P=4$ connections to the network 100 that are designated by four arrows in FIG. 3. Hence FIG. 3 must be modified to include additional channels for a configuration in which the total number of processors is in excess or sixteen. The channels to and from the CPU 305 are indicated with a single connection, however the total bandwidth of these connections should be the same or greater than four network connections.

All processor activity is under the direct control of the CPU 305 which is in turn supervised by the controller 101 via the connection to bus C* (FIG. 1). Controller 101 includes a memory that stores the connection maps described below. These connection maps are transmitted by controller 101 via bus C* to the processors as described above, one map at a time (SIMD) or a plurality of maps at a time (MIMD or DP). In addition to the usual arithmetic and logical functional units, the CPU 305 contains a communications functional unit 308 which sets local switch 302 either from connection maps stored in the local memory 306 or from a highly intelligent look ahead ability to parse the index syntax of the program and determine the appropriate switch settings using the parallel communication algorithms defined in later sections. Alternatively, a communications processor 307 can be included in processor 300 (or connected thereto) to compute the switch settings on the fly for the present and subsequent communications sub-tasks. In this manner, each processor 300 can respond to communication connection instructions from controller 101, or can dynamically compute switch settings on the fly, independent of controller 101.

A communications cycle consists of: a) setting the local switch (LS) 302, b) a send-receive on all network connections, c) local memory LM 306 accesses both to the network send buffer NSB 301 and from the network receive buffer NRB 303 via the CPU 305. The ability to switch incoming transmissions directly to the network send buffer 301 is fundamental to the design and permits all local memory 306 accesses to overlap the send/receive cycle. The design of the processor 300 may vary depending on certain details of the implementation. For example, two network receive buffers 303 may be required, operating in ping-pong mode, with one receiving network transmissions while the other is storing data in memory 306. The role of each functional unit for a specific communication task is described in detail below.

Multiple Pipeline Implementation of the Index Reversal $y(k)=x(N-k)$

The problem of providing maximum bandwidth network communication in a general purpose multiprocessor does not have a strictly architectural solution. It has a combined algorithm/architectural solution if network communication is under program control. Even the simplest computations on a single processor may require a non-trivial parallel communication algorithm when implemented on a multiprocessor. The following example illustrates the use of connection maps to implement a communication task in a multipipeline multiprocessor. The following description illustrates a parallel communication algorithm for the syntax $y(k)=x(N-k)$ that is common to most programming languages. This description is followed by a parallel pipeline implementation for N=32 on a hypercube network with eight processors. The index N−k for the subscripted syntax of this statement is evaluated modulo N, e.g., N−0=0.

Figure 4:
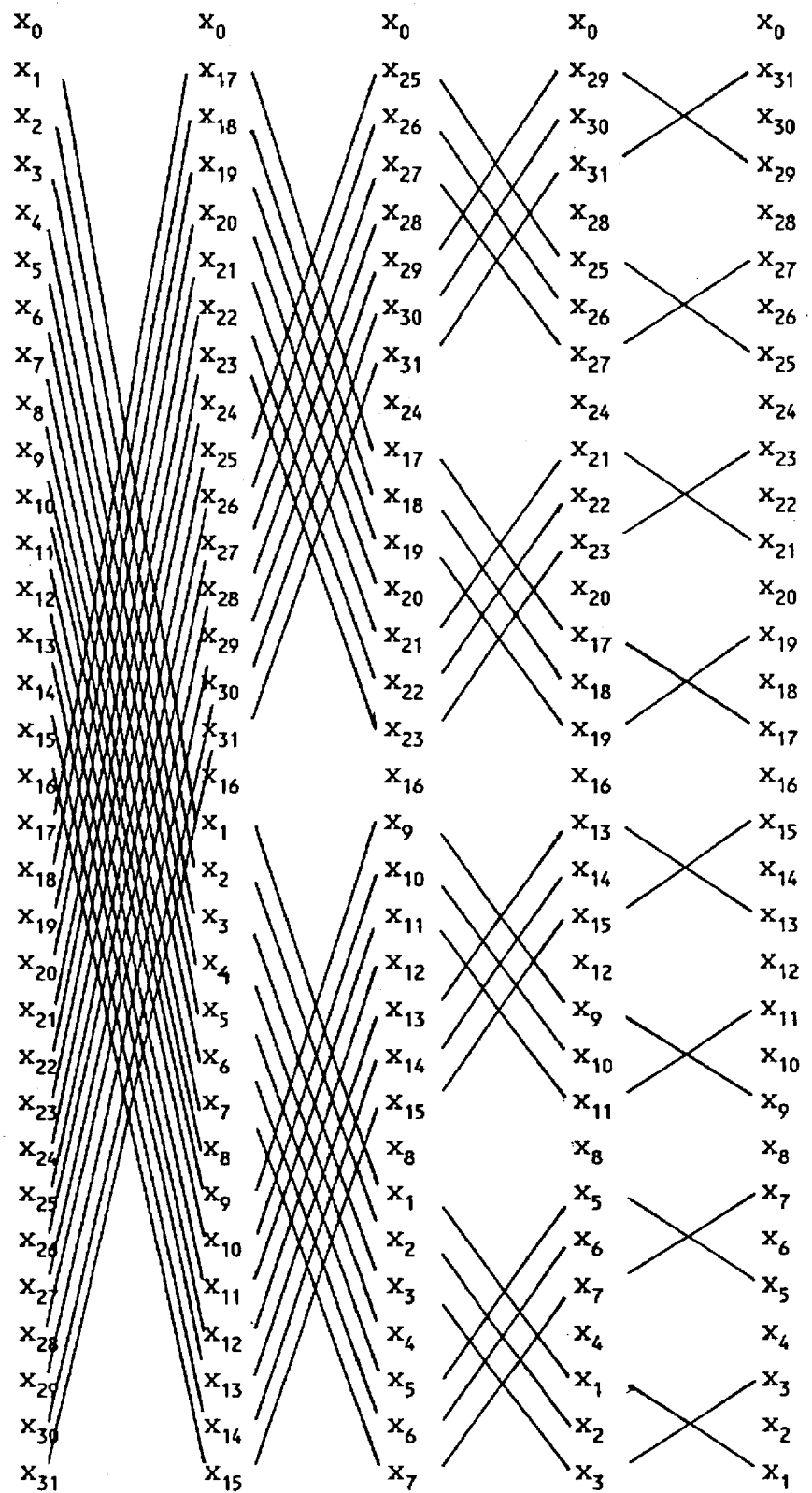
FIG. 4 illustrates a parallel algorithm for the implementation of the syntax y(k)=x(32−k)

The table in FIG. 4 contains a parallel algorithm for the implementation of this partial index reversal of a sequence of thirty-two data elements. The original sequence of thirty-two data elements is stored in the leftmost column of the table of FIG. 4 and the reversed sequence of thirty-two data elements is stored in the rightmost column of FIG. 4. This is not a full index reversal since the position of element $x_0$ remains unchanged. A parallel algorithm for the full index reversal is quite straightforward. The hypercube network 100 in FIGS. 1 and 2 is the underlying architecture of multipipeline multiprocessor 10 and the communication methodology is evident in the table of FIG. 4. The algorithm for the partial index reversal has four phases that correspond to columns 2 through 5 of the table of FIG. 4. In general, $\log_2 P$ phases are required for a sequence with length P. In the first phase of the algorithm, data element $x_1$ is exchanged with data element $x_{17}$, data element $x_2$ with data element $x_{18}$ and so forth. It is evident that a conflict free parallel implementation of this simple computation task requires the use of both the underlying hypercube network 100 in FIG. 1 and the parallel communication algorithm in FIG. 4.

The data movement matches the interconnection network of the hypercube network 100 in FIG. 1 but increased to 32 processing elements. Therefore, if the sequence is stored one word per processing element, the index reversal can be performed in four processing cycles. In general, if N=P then $\log_2 P$ processing cycles are required. However this does not achieve the desired goal of one word per cycle per processing element since $\log_2 P$ cycles are required to deliver one word to each processing element. Note that only one wire can be used on each processing cycle since there is only one word per processing element. In practice, the length of the sequence will likely exceed the number of processing elements so that each processing element contains more than one word. In this case, $\log_2 P$ words can be delivered in $\log_2 P$ cycles which achieves the desired goal of one useful word per cycle per processing element.

In this section, we first use multiple pipelines which almost achieves the desired goal. It falls slightly short due to the startup time required to load the pipes prior to the delivery of one word per cycle per processing element. Nevertheless this approach may be satisfactory since a start up time or latency is a generally accepted property of a pipeline even for a single processor. However below we present optimal algorithms which achieve the goal of one useful word per cycle per processing element without latency. As mentioned above, this goal is achieved by delivering $\log_2 P$ words in $\log_2 P$ cycles.

We proceed now to develop the multiple pipeline implementation of the partial index reversal for the case of eight processing elements 0–7 (P=8) and thirty-two data elements (N=32) in the sequence so each processing element contains four data elements. The hypercube interconnections for the case P=8 correspond to the upper half of FIG. 1. In the table of FIG. 5, the original sequence to processor map is given in the second column and the final reverse index sequence to processor map is in the column on the right. The parallel communication algorithm that implements $y(k)=x(N-k)$ is defined in the intermediate columns using the exchanges defined in Schedule 1 listed below.

We assume that there is only a single bi-directional channel that connects processors 1 and 5 so that the data elements $x_4$ through $x_7$ cannot be exchanged simultaneously with data elements $x_{20}$ through $x_{23}$ respectively. Hence these exchanges must follow one another in successive communication cycles. On the other hand, the data element exchanges $x_4 \leftrightarrow x_{20}$, $x_8 \leftrightarrow x_{24}$, and $x_{12} \leftrightarrow x_{28}$ can proceed simultaneously because they are performed between different processing elements that are connected by different channels or wires shown in the upper half of FIG. 1. Following these data element exchanges we can then perform some of the data element exchanges between columns 2 and 3, namely $x_{20} \leftrightarrow x_{28}$, and $x_4 \leftrightarrow x_{12}$. But at the same time we can also perform some data element exchanges between columns 1 and 2; namely, $x_1 \leftrightarrow x_{17}$, $x_5 \leftrightarrow x_{21}$, $x_9 \leftrightarrow x_{25}$, and $x_{13} \leftrightarrow x_{29}$. This overlapping of data element exchanges requires multi-wire communication or the ability to communicate on all interconnections of the hypercube network in FIG. 1 simultaneously. Roughly speaking, FIG. 5 contains the data element exchanges in FIG. 4 but time shifted to take advantage of the multi-wire capability of interconnection network 100.

The index reversal operation can be performed in six communication cycles that are given in Schedule 1 and FIG. 5. Wires are numbered according to the bit that is different between the processing elements that are connected by the wire. For example, the wire that connects processing element 0=000$_b$ and 4=100$_b$ is called wire 2 since bits are numbered right to left (least to most significant) beginning with bit number zero. Traditionally, all of the wires between the second and third columns of FIG. 2 are collectively referred to as wire 2, perhaps because transmissions on these wires occur simultaneously. There are P wires with the same number if communication is bi-directional. For unidirectional communication there are P/2 wires.

The contents of each processing element following each communication cycle are given in FIG. 5. The exchanges corresponding to FIG. 5 are given in Schedule 1 below. In FIG. 5, the column to the right of column 1 is obtained from the column to the left of column 1 by performing the data element exchanges corresponding to Communication cycle 1 in Schedule 1 below. Cycle 6a is performed in-processor and is therefore not considered a "true" communication cycle.

Schedule 1
Pipelined Communication Schedule for $y(k) = x(32 - k)$
The contents of the processing elements are listed in FIG. 5

| Communication cycle 1 | | | |
|---|---|---|---|
| wire 2 | $x_4 \leftrightarrow x_{20}$ | $x_8 \leftrightarrow x_{24}$ | $x_{12} \leftrightarrow x_{28}$ |
| Communication cycle 2 | | | |
| wire 2 | $x_1 \leftrightarrow x_{17}$ | $x_5 \leftrightarrow x_{21}$ | $x_9 \leftrightarrow x_{25}$ | $x_{13} \leftrightarrow x_{29}$ |
| wire 1 | | $x_{20} \leftrightarrow x_{28}$ | | $x_4 \leftrightarrow x_{12}$ |
| Communication cycle 3 | | | |
| wire 2 | $x_2 \leftrightarrow x_{18}$ | $x_6 \leftrightarrow x_{22}$ | $x_{10} \leftrightarrow x_{26}$ | $x_{14} \leftrightarrow x_{30}$ |
| wire 1 | $x_{17} \leftrightarrow x_{25}$ | $x_{21} \leftrightarrow x_{29}$ | $x_1 \leftrightarrow x_9$ | $x_5 \leftrightarrow x_{13}$ |
| Communication cycle 4 | | | |
| wire 2 | $x_3 \leftrightarrow x_{19}$ | $x_4 \leftrightarrow x_{23}$ | $x_{11} \leftrightarrow x_{27}$ | $x_{15} \leftrightarrow x_{31}$ |
| wire 1 | $x_{18} \leftrightarrow x_{26}$ | $x_{22} \leftrightarrow x_{30}$ | $x_2 \leftrightarrow x_{10}$ | $x_6 \leftrightarrow x_{14}$ |
| wire 0 | $x_{25} \leftrightarrow x_{29}$ | $x_{17} \leftrightarrow x_{21}$ | $x_9 \leftrightarrow x_{13}$ | $x_1 \leftrightarrow x_5$ |
| Communication cycle 5 | | | |
| wire 1 | $x_{19} \leftrightarrow x_{27}$ | $x_{23} \leftrightarrow x_{31}$ | $x_3 \leftrightarrow x_{11}$ | $x_7 \leftrightarrow x_{15}$ |
| wire 0 | $x_{26} \leftrightarrow x_{30}$ | $x_{18} \leftrightarrow x_{22}$ | $x_{10} \leftrightarrow x_{14}$ | $x_2 \leftrightarrow x_6$ |
| Communication cycle 6 | | | |
| wire 0 | $x_{27} \leftrightarrow x_{31}$ | $x_{19} \leftrightarrow x_{23}$ | $x_{11} \leftrightarrow x_{15}$ | $x_3 \leftrightarrow x_7$ |

The last data element in each processing element is moved on the fourth or (N/P)th communication cycle and two or (d−1) more cycles are required to move it to its final destination. In general N/P+d−1 communication cycles are required to reverse the index. This almost provides the desired goal of a multipipeline multiprocessor for $y(k)=x(N-k)$. After a start up of d−1 cycles, one element is provided to each processing element on each communication cycle.

Optimal Communications Algorithms

Although the pipeline algorithm disclosed above is very efficient it is nevertheless not optimal. The optimal algorithm for this computational task is somewhat more complex but achieves the desired goal of one useful element to each processing element on each cycle. For general P and N, the optimal algorithm requires no more than max(d, N/P) communication cycles where d=log$_2$P. The pipeline algorithm in the previous section has both a ramp-up and ramp-down phase in which transmissions are not occurring on all wires. In this section, all or nearly all wires are being used on all of the communication cycles. This produces an index reversal in four communication cycles compared to six required by the pipeline algorithm given in the previous section. The exchanges corresponding to the optimal algorithm are given in Schedule 2 below and the resulting processing element contents are listed in the table of FIG. 6. The data element exchanges are developed using the concept of relative address. For example, data element $x_1$ begins in processing element 0=000$_b$ and ends in processing element 7=111$_b$. The relative address of processing element 0=000$_b$ and processing element 7=111$_b$ is also a three bit binary number with a zero bit if the corresponding bits of the processing element numbers are equal and a 1 if the corresponding bits of the processing element numbers are different. That is, relative address is the logical exclusive- or of the beginning processing element number and ending processing element number. The significance of the relative address is to provide the route that data element $x_1$ must follow to reach its destination. Recall that any two processing elements are connected only if their binary representations differ in a single bit. The relative address indicates that three bits are different hence data element $x_1$ must be sent on all three wires to reach its destination. The order of the wires is arbitrary but clearly three transmissions are necessary since data element $x_1$ cannot be sent on two wires at the same time. Schedule 2 below contains all the routes that each data element must take, organized in a manner that minimizes communication. It is constructed from data element exchanges so that the memory requirements of each processing element remain constant throughout all communication cycles.

Schedule 2
Optimum Communication Schedule for y(k) = x(32 − k)
The contents of the processing elements are listed in the table of FIG. 6

Communication cycle 1

| wire 0 | $x_1 \leftrightarrow x_5$ | $x_9 \leftrightarrow x_{13}$ | $x_{17} \leftrightarrow x_{21}$ | $x_{25} \leftrightarrow x_{29}$ |
| wire 1 | $x_2 \leftrightarrow x_{10}$ | $x_6 \leftrightarrow x_{14}$ | $x_{18} \leftrightarrow x_{26}$ | $x_{22} \leftrightarrow x_{30}$ |
| wire 2 | $x_3 \leftrightarrow x_{19}$ | $x_7 \leftrightarrow x_{23}$ | $x_{11} \leftrightarrow x_{27}$ | $x_{15} \leftrightarrow x_{31}$ |

Communication cycle 2

| wire 0 | $x_{19} \leftrightarrow x_{23}$ | $x_{27} \leftrightarrow x_{31}$ | $x_3 \leftrightarrow x_7$ | $x_{11} \leftrightarrow x_{15}$ |
| wire 1 | $x_5 \leftrightarrow x_{13}$ | $x_1 \leftrightarrow x_9$ | $x_{21} \leftrightarrow x_{29}$ | $x_{17} \leftrightarrow x_{25}$ |
| wire 2 | $x_{10} \leftrightarrow x_{26}$ | $x_{14} \leftrightarrow x_{30}$ | $x_2 \leftrightarrow x_{18}$ | $x_6 \leftrightarrow x_{22}$ |

Communication cycle 3

| wire 0 | $x_{26} \leftrightarrow x_{30}$ | $x_{18} \leftrightarrow x_{22}$ | $x_{10} \leftrightarrow x_{14}$ | $x_2 \leftrightarrow x_6$ |
| wire 1 | $x_{23} \leftrightarrow x_{31}$ | $x_{19} \leftrightarrow x_{27}$ | $x_7 \leftrightarrow x_{15}$ | $x_3 \leftrightarrow x_{11}$ |
| wire 2 | $x_{13} \leftrightarrow x_{29}$ | $x_4 \leftrightarrow x_{20}$ | $x_5 \leftrightarrow x_{21}$ | $x_{12} \leftrightarrow x_{28}$ |

Communication cycle 4

| wire 1 | $x_{20} \leftrightarrow x_{28}$ | $x_4 \leftrightarrow x_{12}$ | | |
| wire 2 | $x_9 \leftrightarrow x_{25}$ | $x_8 \leftrightarrow x_{24}$ | $x_1 \leftrightarrow x_{17}$ | |

These above-noted communication cycles therefore comprise a series of time sequential communication sub-tasks, when executed on interconnection network 100 comprise the defined computation task. Therefore, this plurality of communication sub-tasks comprise a connection map that can be computed or stored in memory 306. Each time that the multipipeline multiprocessor 100 receives the computational task y(k)=x(32−k), this connection map is computed or retrieved from memory 306 by the CPU 305 which sequentially sets switch 302 via the connection 304. The controller 101 activates interconnection network 100 to execute the first communication sub-task of this connection map during a first network time interval. Successive communication sub-tasks are executed in interconnection network 100 during successive time intervals until the computation task is completed.

Additional Examples

Consider next the optimal communication algorithm for the implementation of the syntax y(k)=x(4*k+i) where i=0, 1,2, and 3. The data element exchanges are listed in Schedule 3 and the processing element contents corresponding to each communication cycle are given in FIG. 7. This ordering is also equivalent to the transposition of a 4 by 8 array and is a starting point for the treatment of multidimensional arrays.

Schedule 3
Optimum Communication Schedule for y(k) = x(4 * k + i)
where i = 0,1,2,3, P = 8 and N = 32
The contents of the processing elements are listed in the table of FIG. 7

Communication cycle 1

| wire 1 | $x_1 \leftrightarrow x_8$ | $x_5 \leftrightarrow x_{12}$ | $x_{19} \leftrightarrow x_{26}$ | $x_{23} \leftrightarrow x_{30}$ |
| wire 2 | $x_3 \leftrightarrow x_{17}$ | $x_7 \leftrightarrow x_{21}$ | $x_{10} \leftrightarrow x_{24}$ | $x_{14} \leftrightarrow x_{28}$ |

Communication cycle 2

| wire 1 | $x_{17} \leftrightarrow x_{24}$ | $x_{14} \leftrightarrow x_{28}$ | $x_3 \leftrightarrow x_{10}$ | $x_7 \leftrightarrow x_{14}$ |
| wire 2 | $x_2 \leftrightarrow x_{16}$ | $x_6 \leftrightarrow x_{20}$ | $x_{11} \leftrightarrow x_{25}$ | $x_{15} \leftrightarrow x_{29}$ |

Communication cycle 3

| wire 0 | $x_4 \leftrightarrow x_{16}$ | $x_5 \leftrightarrow x_{17}$ | $x_6 \leftrightarrow x_{18}$ | $x_7 \leftrightarrow x_{19}$ |

Communication cycle 4

| wire 0 | $x_{12} \leftrightarrow x_{24}$ | $x_{13} \leftrightarrow x_{25}$ | $x_{14} \leftrightarrow x_{26}$ | $x_{15} \leftrightarrow x_{27}$ |

This example can be used to explain a fundamental difference between the multiple pipeline processor and the traditional pipeline on the single processor. In the last column of the table of FIG. 8 we observe that the first element in processing elements 0, 2, 4, and 6 all originate in the same processing element p=0 in the second column. Since the elements in p=0 must be sent sequentially it is therefore not possible for them to arrive simultaneously as the first elements to be received by processing elements 0, 2, 4, and 6. Therefore it is not possible to develop multiple pipelines which transmit the elements in the order defined by the syntax subscript. That is, although the pipelines produce one useful element per cycle per processing element, they may not be produced in the order specified by the syntax subscript. This result explains why the processors Pi of multipipeline multiprocessor 10 are connected to the local memory 306 in FIG. 3 rather than to vector registers (not shown) that would be located on the connection network 100. This configuration assumes that the communication task is completed before the data is accessed by the processing elements. However, a second communication task could begin at this point, thereby overlapping communication and computation. Alternatively, the data could be processed in the order received but some important modifications to the computational organization would be required.

The final example is an optimal communication algorithm for the implementation of the syntax y(k)=x(3*k+i) where i=0,1, and 2. This can also be viewed as the transposition of a 3 by 10 array in which the data elements $x_{30}$ and $x_{31}$ are not used. The exchanges are listed in Schedule 4 and the processing element contents corresponding to each communication cycle are given in FIG. 8. The column on the left of the table contains the initial sequence of data elements and the column on the right of the table contains the final ordering of data elements. Note that only two communication cycles are required to complete the computational task, which points out the fact that the maximum number N/P of communication cycles are not always required.

Schedule 4
Optimum Communication Schedule for y(k) = x(3 * k + i)
where i = 0,1,2, P = 8, and N = 32
The contents of the processing elements are listed in the table of FIG. 8

Communication cycle 1

| wire 1 | $x_1 \leftrightarrow x_9$ | $x_4 \leftrightarrow x_{12}$ | $x_{17} \leftrightarrow x_{25}$ | $x_{20} \leftrightarrow x_{28}$ |
| wire 2 | $x_2 \leftrightarrow x_{18}$ | $x_5 \leftrightarrow x_{21}$ | $x_8 \leftrightarrow x_{24}$ | $x_{14} \leftrightarrow x_{30}$ |

Communication cycle 2

| wire 0 | $x_6 \leftrightarrow x_{18}$ | $x_{10} \leftrightarrow x_{30}$ | $x_2 \leftrightarrow x_{22}$ | $x_{14} \leftrightarrow x_{26}$ |
| wire 1 | $x_7 \leftrightarrow x_{15}$ | $x_{23} \leftrightarrow x_{31}$ | | |
| wire 2 | $x_{11} \leftrightarrow x_{27}$ | | | |

We conclude this section with a detailed description of the implementation of this schedule and hence the syntax y(k)=x(3*k+i) using the processor functionality in FIG. 3. There are p=3 locations in both the network receive buffer NRB 303 and network send buffer NSB 301 corresponding to the wire on which the location is received or transmitted, respectively. For example, location 0 in the NSB 301 is reserved for transmission on wire 0. An incoming wire p is designated $I_p$ and the locations in the NRB and NSB buffers 303, 301 are also designated with subscripts. An incoming data element on wire 0 that is switched to the second location in the NSB 301 is designated by: $I_0$ to $NSB_2$. The state of the local switch LS 302 is determined by ≦p such descriptors. We now describe the implementation of Schedule 4 but confine our attention to the event in processing element p=0 as representative of the events in the other processing elements.

Events in processing element p=0 that implement the syntax y(k)=x(3*k+i) using Schedule 4 and the processor functionality in FIG. 8.

1. move $x_1$ from LM to $NSB_1$ and $x_2$ to $NSB_2$
2. set LS: $I_1$ to $NRB_1$ and $I_2$ to $NSB_0$
3. network send/receive (note that $x_{18}$ is received on $I_2$ and hence switched to $NSB_0$)
4. move $x_9$ from $NRB_1$ to LM
5. set LS: $I_0$ to $NRB_0$
6. network send/receive
7. move $x_6$ from $NRB_0$ to LM These examples illustrate the method of dividing each computation task into a plurality of communication sub-tasks, each of which provides substantially one useful word to each processing element during each time interval (processing cycle).

It will be apparent to those skilled in the art that the method and means of the present invention may be extended to other network topologies in addition to the presently preferred embodiment in hypercube systems. There are hypercube-like systems and those which blend a plurality of network topologies such as hypercube-mesh systems on which interprocessor communications may be optimized in accordance with the present invention. Other possible network topologies include various tree-like arrangements, torous, mesh and others. The concept of the invention on any system architecture remains the same: providing a communications map to configure interprocessor network input and output connections, dynamically, in accordance with known computational tasks (which are generally index-dependent calculations typical of array-type computation). A particular class of computations which is particularly well-adapted to the algorithm in the present invention are fast transform calculations (such as Fourier), in which there is a great deal of interprocessor communication across the network.

While a specific embodiment of this invention has been disclosed, it is expected that those skilled in the art can and will design alternate embodiments of this invention that fall within the scope of the appended claims.

I claim:

1. A multipipeline multiprocessor comprising a hypercube-like processor interconnection network capable of transmitting on all wires simultaneously, that interconnects P processors via bidirectional communication paths, each of said P processors having d inputs and d outputs, where d is equal to a positive integer no greater than $\log_2 P$, each of said processors comprises:

computing means;
   memory means connected to said d outputs for transmitting data on selected ones of said d outputs;
   network means, including a local switch, for connecting selected ones of said d inputs to said memory means to collate communications between said processor interconnection network and said memory means;
   means for storing a plurality of connection maps, each of which maps from a defined computation task to a predefined interconnection of said d inputs and said d outputs; and
   wherein said computing means is responsive to a receipt of a computation task, for retrieving a one of said connection maps, corresponding to said received computation task, from said storing means to activate said network means and said memory means to interconnect said d inputs and said d outputs, respectively, as defined by said transmitted connection map.

2. The apparatus of claim 1 wherein each of said d inputs of said processor are switchably connectable to d outputs of another of said P processors and each said d outputs of said processor are switchably connectable to d inputs of another of said P processors via said hypercube-like network.

3. The apparatus of claim 1 wherein said memory means comprises:
   receive buffer means connected to said network means and said computing means for storing data received on said d inputs;
   transmit buffer means connected to said network means and said computing means for storing data for transmission on said d outputs.

4. The apparatus of claim 3 wherein said network means switchably connects ones of said d inputs directly to said transmit buffer means.

5. The apparatus of claim 3 wherein said computing means activates said network means to interconnect one of said d inputs to said memory means as a function of one of said connection maps.

6. The apparatus of claim 3 wherein said computing means activates said memory means to transmit data on selected ones of said d outputs as a function of one of said connection maps.

7. The apparatus of claim 2 wherein said connection maps comprise a time and space definition of network means and memory means activation.

8. The apparatus of claim 7 wherein said connection map comprises said computation task divided into r predefined communication sub-tasks, wherein said r predefined communication sub-tasks executed on said network means and said memory means implements said computation task.

9. The apparatus of claim 8 wherein said network means in said P processors are operated in synchronization in predefined time intervals, successive ones of said r predefined communication sub-tasks are executed in successive time intervals of said network means.

10. The apparatus of claim 9 wherein each said predefined communication sub-task comprises a parallel process.

11. The apparatus of claim 7 wherein said computing means interleaves at least one of said predefined communication sub-tasks of a first defined computation task with at least one predefined communication sub-task of a second defined computation task, received later than said first defined computation task.

12. The apparatus of claim 1 wherein said defined computation tasks are defined in subscripted syntax.

13. The apparatus of claim 1 wherein said computing means interleaves in time a first and a second of said plurality of connection maps.

14. The apparatus of claim 1 wherein each of said processors further comprise:
   communication connection computing means connected to said storing means for generating said connection maps on the fly.

15. In a multipipeline multiprocessor that comprises a hypercube-like processor interconnection network, capable of transmitting on all wires simultaneously, that interconnects P processors via bidirectional communication paths, each of said P processors having d inputs and d outputs, where d is equal to a positive integer no greater than $\log_2 P$, each of said processors comprising computing apparatus, a memory connected to said d outputs for transmitting data on selected ones of said d outputs, a network, including a local switch, for connecting selected ones of said d inputs to said memory to collate communications between said processor interconnection network and said memory, a method of interconnecting said d inputs and said d outputs comprising the steps of:

storing a plurality of connection maps in a map memory, each of which connection maps translates a defined computation task into a predefined interconnection of said d inputs and said d outputs; and retrieving, in response to a receipt of a computation task, a one of said connection maps, corresponding to said received computation task, from said map memory to activate said network and said memory to interconnect said d inputs and said d outputs, respectively, as defined by said transmitted connection map.

16. The method of claim 15 wherein each of said d inputs of said processor are switchably connectable to d outputs of another of said P processors and each said d outputs of said processor are switchably connectable to d inputs of another of said P processors via said hypercube-like network.

17. The method of claim 15 wherein said memory comprises a receive buffer connected to said network and said computing apparatus for storing data received on said d inputs, a transmit buffer connected to said network and said computing apparatus for storing data for transmission on said d outputs, said computing apparatus activates said network to interconnect one of said d inputs to said memory and said memory to transmit data on selected ones of said d outputs as a function of one of said connection maps.

18. The method of claim 17 wherein said network switchably connects ones of said d inputs directly to said transmit buffer.

19. The method of claim 16 wherein said connection maps comprise a time and space definition of network activation.

20. The method of claim 19 wherein said connection map comprises said computation task divided into r predefined communication sub-tasks, wherein said r predefined communication sub-tasks executed on said network and said memory implements said computation task.

21. The method of claim 20 wherein said network in said P processors are operated in synchronization in predefined time intervals, successive ones of said r predefined communication sub-tasks are executed in successive time intervals of said network.

22. The method of claim 21 wherein each said predefined communication sub-task comprises a parallel process.

23. The method of claim 15 wherein said step of retrieving interleaves at least one of said predefined communication sub-tasks of a first defined computation task with at least one predefined communication sub-task of a second defined computation task, received later than said first defined computation task.

24. The method of claim 15 wherein said defined computation tasks are defined in subscripted syntax.

25. The method of claim 15 wherein said step of retrieving interleaves in time a first and a second of said plurality of connection maps.

26. The method of claim 15 wherein said method further comprises the step of:

generating said connection maps on the fly.

27. A multipipeline multiprocessor comprising:

a plurality of processors, each processor having inputs and outputs;

a network for interconnecting, under control of a controller, selected ones of said inputs and outputs of each of said plurality of processors to inputs and outputs of other of said plurality of processors;

means for providing a plurality of connection maps, each of which maps from a defined computation task to a predefined interconnection of processor inputs and outputs; and means for transmitting, in response to a receipt of a computation task, one of said connection maps, corresponding to said received computation task, to said controller to activate said network as defined by said transmitted connection map.

28. The apparatus of claim 27 wherein each of said processors comprises:

computing means;

memory means connected to said processor outputs and said computing means for transmitting data on selected ones of said processor outputs;

means for connecting selected ones of said processor inputs to said memory means and said computing means;

means, responsive to control signals received from said controller for activating said memory means to transmit data on selected ones of said processor outputs substantially concurrently with said connecting means connecting selected ones of said processor inputs to said memory means and said computing means.

29. A method in a multipipeline multiprocessor comprising a plurality of processors, each processor having inputs and outputs, a network for interconnecting, under control of a controller, selected ones of said inputs and outputs of each of said plurality of processors to inputs and outputs of other of said plurality of processors, comprising the steps of:

providing a plurality of connection maps, each of which maps from a defined computation task to a predefined interconnection of processor inputs and outputs; and transmitting, in response to a receipt of a computation task, one of said connection maps, corresponding to said received computation task, to said controller to activate said network as defined by said transmitted connection map.

30. The method of claim 29 wherein each of said processors comprises computing apparatus and a memory connected to said processor outputs and said computing apparatus, further comprising the step of:

activating, in response to control signals received from said controller, said memory to transmit data on selected ones of said processor outputs and substantially concurrently connecting selected ones of said processor inputs to said memory and said computing apparatus.

* * * * *